United States Patent
Gupta (12) 
(10) Patent No.: US 8,055,666 B2
(45) Date of Patent: *Nov. 8, 2011

(54) METHOD AND SYSTEM FOR OPTIMIZING DATABASE PERFORMANCE

(75) Inventor: Sanjay Gupta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/206,799

(22) Filed: Sep. 9, 2008

(65) Prior Publication Data

US 2009/0094194 A1    Apr. 9, 2009

Related U.S. Application Data

(63) Continuation of application No. 10/644,295, filed on Aug. 20, 2003, now Pat. No. 7,516,115.

(51) Int. Cl.
*G06F 17/30* (2006.01)

(52) U.S. Cl. ...................................................... 707/753

(58) Field of Classification Search .................. 707/753
See application file for complete search history.

(56) References Cited

U.S. PATENT DOCUMENTS

| | | | | |
|---|---|---|---|---|
| 5,737,591 A * | 4/1998 | Kaplan et al. | ........................... | 1/1 |
| 5,752,025 A * | 5/1998 | Shakib et al. | ........................... | 1/1 |
| 6,058,391 A * | 5/2000 | Gardner | .................................. | 1/1 |
| 6,065,011 A | 5/2000 | Bulusu et al. | | |
| 6,073,129 A * | 6/2000 | Levine et al. | ........................... | 1/1 |
| 6,230,200 B1 * | 5/2001 | Forecast et al. | ................ | 709/226 |
| 6,493,701 B2 | 12/2002 | Ponnekanti | | |
| 7,516,115 B2 * | 4/2009 | Gupta | ...................................... | 1/1 |
| 2001/0013030 A1 | 8/2001 | Colby et al. | | |
| 2001/0018684 A1 * | 8/2001 | Mild et al. | ......................... | 707/1 |
| 2001/0056428 A1 * | 12/2001 | Gajda et al. | .................... | 707/100 |
| 2002/0120617 A1 * | 8/2002 | Yoshiyama et al. | .............. | 707/3 |
| 2003/0088739 A1 * | 5/2003 | Wilkes et al. | ................... | 711/133 |
| 2005/0251525 A1 * | 11/2005 | Chu et al. | ....................... | 707/100 |

OTHER PUBLICATIONS

Notice of Allowance in U.S. Appl. No. 10/644,295.

* cited by examiner

*Primary Examiner* — Cheryl Lewis (74) *Attorney, Agent, or Firm* — Anne Linne; Roberts Mlotkowski Safran & Cole, P.C.

(57) ABSTRACT

A method and system is provided that optimizes performance in non-relational databases. According to one aspect, view index size is kept at a level that optimizes performance by categorizing and sorting only a subset of the columns contained within the corresponding view. The remaining columns are marked as having been categorized and sorted, but are not actually categorized and sorted until these columns are queried.

25 Claims, 6 Drawing Sheets

METHOD AND SYSTEM FOR OPTIMIZING DATABASE PERFORMANCE

CROSS REFERENCE TO RELATED APPLICATIONS

This application is a continuation of U.S. patent application Ser. No. 10/644,295, filed Aug. 20, 2003, issued as U.S. Pat. No. 7,516,115 on Apr. 7, 2009, the disclosure of which is expressly incorporated by reference herein in its entirety.

BACKGROUND OF THE INVENTION

1. Field of the Invention

The present invention generally relates to optimization of database performance, and more particularly, optimization of performance in non-relational databases.

2. Background of the Invention

Efficient access to data stored in a database can be problematic as the size of a single database index and/or accumulative size of all indexes in a database grows. For example, many non-relational databases (non-RDBMs) may provide the foundation and knowledge base of a wide range of business, organization or institution operations, but these databases may contain such vast amounts of data that access and performance is impaired. Typically, non-relational databases and associated content often are developed over long periods of time, and frequently, becomes a legacy resource that is familiar and dependable in nature. This development of resources includes a vast amount of information that may be critical to the business or organization. Also over periods of time, additional users or applications may be added that compete for access to the data within the databases causing more processing overhead on the data management system. Even with these problems, there is an aversion to replacing or altering working database platforms.

As the non-hierarchical database grows in size, performance typically suffers and access times to the database grows accordingly, sometimes exponentially. As a response, transitions to relational databases are often undertaken to alleviate these performance issues, but these attempts can be very expensive and risky. These transitions may also require new hardware and software platforms that are necessary in supporting the new database architectures. As a result, loss of integrity and confidence in the database contents might develop as well-as significant funding and training issues.

A non-relational database structure may be used for data that may be either hierarchical data or categorized data, or both. Traditionally, indexes to non-relational databases are stored in the databases themselves so that as the index size increases, the database size and access times to the database also increases. Conversely, it can be demonstrated that as the size of the view, consequently the size of the index and database is reduced, the database performance increases with regards to access time and processing speed.

Access to record content within the non-hierarchical databases is typically via an index mechanism. That is, all indexes are typically maintained as a view, often in memory or cache, for all records within the database. (A view includes a sorted and/or categorized list of documents and is the entry points into the data stored in the non-relational database.) This indexing mechanism has disadvantages in that memory utilization and processing becomes excessive, particularly when many access requests are presented. In large non-RDBMs, the necessarily large view index size requires substantial overhead in terms of processing and memory management as data may not be normalized in the RDBMs. As the database increases in size, and hence the view indexes associated with the database, access performance issues compound. This is particularly an issue in client-server architectures where all requests flow through the server and the server must typically maintain view(s) of the entire database. The amount of bytes flowing over the network to clients is then generally related to the size of the maintained views.

If a legacy non-relational database can be preserved and its life extended by maintaining or improving performance of the non-RDBMs database, migrating to a relational database might be avoided or significantly postponed which may be much more attractive than incurring costs, risks, training factors, inconvenience, and the like, associated with migrating to a relational database.

SUMMARY OF THE INVENTION

In an aspect of the invention a method for optimizing performance of a database is provided and includes the steps of sorting and categorizing a first set of columns within a view of the database and marking a second set of columns within the view as if the second set of columns were already sorted and categorized prior to actual sorting and categorizing of the second set of columns, the second set of columns including all columns exclusive of the first set of columns.

In another aspect of the invention, a method is provided for optimizing performance of a database, comprising the steps of sorting and categorizing a first set of columns within a view of the database, marking a second set of columns within the view, wherein the second set of columns comprises all columns within the view that are not in the first set of columns, and wherein the marking indicates that sorting and categorizing has been performed on the second set of columns without actually performing the sorting and the categorizing. Further provided is a step for sorting and categorizing at least one column of the second set of columns in response to performing a query on the at least one column.

In another aspect of the invention, a system to optimize database performance is provided comprising a component to sort and categorize a first set of columns within a view of the database, a component to mark a second set of columns within the view, wherein the second set of columns comprises all columns within the view that are not in the first set of columns, and wherein the mark indicates that sorting and categorizing has been performed on the second set of columns without actually having performed the sorting and the categorizing, and a component to sort and categorize at least one column of the second set of columns in response to a query on the at least one column.

In another aspect of the invention, a computer program product comprising a computer usable medium having readable program code embodied in the medium is provided and includes a first computer program code to sort and categorize a first set of columns within a view of a database, a second computer program code to mark a second set of columns within a view, wherein the second set of columns comprises all columns within the view that are not in the first set of columns, and wherein the mark indicates that sorting and categorizing has been performed on the second set of columns without actually having performed the sorting and the categorizing, and a third computer program code to sort and categorize at least one column of the second set of columns in response to a query on the at least one column.

BRIEF DESCRIPTION OF THE DRAWINGS

The foregoing and other objects, aspects and advantages will be better understood from the following detailed description of embodiments of the invention with reference to the drawings, in which.

DETAILED DESCRIPTION OF EMBODIMENTS OF THE INVENTION

The invention is directed to a method and apparatus to substantially enhance access to data stored in non-relational databases (non-RDBMs). Specifically, the method and apparatus of the invention is designed to increase efficiencies in processing time, bandwidth, or memory management of non-RDBMs by reducing the view index size based on parameters such as, for example, the number of sorted and/or categorized columns in the view.

Figure 1:
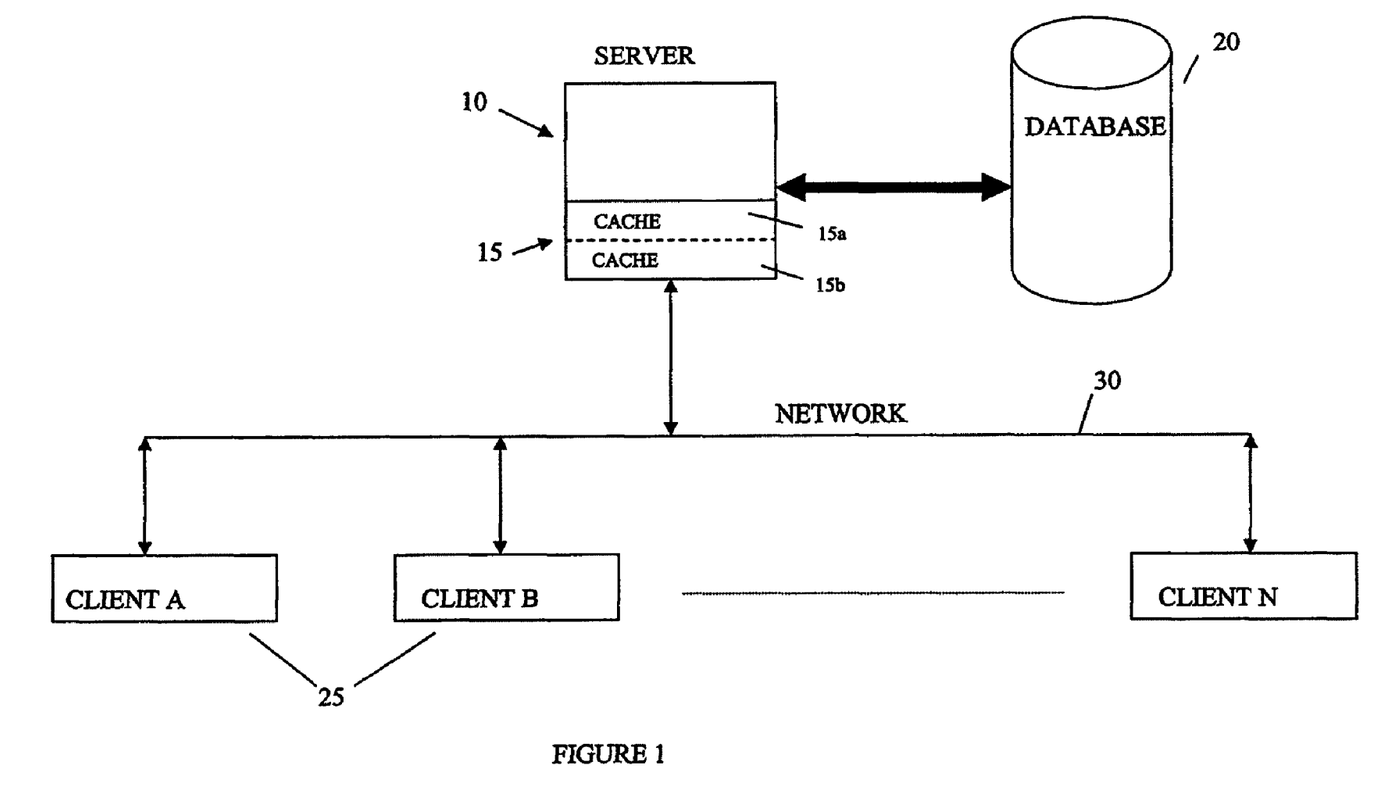
FIG. 1 is an illustrative diagram showing an embodiment of an environmental configuration suitable for using the invention.

FIG. 1 is an illustrative diagram showing an embodiment of an environmental configuration suitable for using the invention. The configuration includes a server 10 that may include cache 15. The server 10 provides database access and management control to a non-relational database 20 on behalf of one or more users and client applications, generally referred to as clients 25. The clients 25 may be interconnected with the server 10 via one or more networks 30. The server 10 accepts database access inquiries from one or more clients 25 and accesses the non-relational database 20 accordingly and returns results of the inquiry. One of ordinary skill in the art will recognize that many variations of this embodiment are possible.

Table 1 shows a view having hierarchical data or categorized non-hierarchical data, or both, in accordance with the invention and may be maintained in a non-relational database (e.g., database 20). Hierarchical data implies a parent-child relationship between data. Categorized data implies that data can be grouped under categories. The term "data", used herein, may include hierarchical data, categorized hierarchical data, and alternatively, categorized non-hierarchical data. A view may include all or a portion of the data within a database, however, more than one view may exist for the same database. Table 1 is one example of the contents of a view.

TABLE 1

| Index | BOM Id | Assembly | Part No. | Price | Sub-Part No. | Price |
|---|---|---|---|---|---|---|
| 1 | 0001 | A | 01 | 1.75 | 001 | 0.50 |
| 2 | | | | | 002 | 1.00 |
| 3 | | | | | 003 | 0.25 |
| 4 | | B | 02 | 0.20 | 004 | 0.10 |
| 5 | | | | | 005 | 0.10 |
| 6 | | B | 03 | 0.45 | 006 | 0.20 |
| 7 | | | | | 003 | 0.25 |
| 8 | 0002 | C | 04 | 6.60 | 006 | 0.20 |
| 9 | | | | | 007 | 6.40 |
| ... | ... | ... | ... | ... | ... | ... |
| 710001 | 8001 | D | 05 | 75.60 | 102 | 1.50 |
| 710002 | | | | | 001 | 0.50 |
| 710003 | | | | | 007 | 6.40 |
| ... | ... | ... | ... | ... | ... | ... |
| 710300 | | E | 06 | 24.40 | 306 | 0.25 |
| ... | ... | ... | ... | ... | ... | ... |
| Col. 1 | 2 | 3 | 4 | 5 | 6 | 7 |

The view of Table 1 is, in an embodiment, created, organized and indexed by a database administrator (or equivalent) by defining the sorted/categorized column(s) with hierarchical/nonhierarchical data. In client-server architectures, the view may be typically accessible only by the server (e.g., server 10) on which it resides (i.e., no network traffic involved). The view is indexed and typically cached (e.g., cache 15). The term "index" herein after may be singular or plural.

The representation of Table 1 is only one embodiment of which many different variations of database content and structural organization may exist and be suitably managed by the invention. The term "index" hereinafter may be singular or plural. Table 1 is shown having seven columns (col. 1-7) and includes a view Index (col. 1), BOM Id (col. 2) (i.e., Bill of Material Id), Assembly (col. 3), Part No. (col. 4), Price (col. 5), Sub-Part No. (col. 6), and Price (col. 7).

The view index increases geometrically for each added column to the index. Therefore, in accordance with the invention, server 10, manages the view of Table 1 and takes action to reduce the view index size based on parameters such as, for example, the number of sorted and/or categorized columns in the view, number of records that can be accessed by the view, and the average number of records per category or hierarchy at each level, etc.

The server 10 analyses the columns in a view that are used to create the index and divides the columns into two categories, one category for indicating those columns used to create the index, and the second includes columns that are marked as used to create the index, but are not actually used to build the index. The second set of columns may be sorted and categorized when a query is made or a subset of the data in the column(s) may be sorted, categorized and indexed separately in a view. These views are known as mini-views. These views are known as mini-views and are typically (but certainly not exclusively) used only by the server and is transparent to clients or users.

Table 2 shows a view including these two types of categories, which may be created by the server (or equivalent) and includes a mini-index map (col. 2). Columns 3, 4 and 5 are indexed (i.e., BOM Id, Assembly, and Part No., respectively), however, column 8 is not indexed (i.e., Price), but is marked as indexed. A client, however, would be able to observe that all these categories are available, including Price (col. 8), since it is marked as indexed. Since column 8 is not actually indexed, the total number of indexed database records in column 1 (i.e., 24,051) is substantially less as compared to Table 1, column 1 (i.e., 710,300), according to this example. This is a substantial reduction in index size, and provides one example of the implementation of the invention. It should be recognized that other examples are equally possible, and that the view of Table 2 is provided as one illustration for purposes of discussion.

TABLE 2

| Index | Mini Index Map | BOM Id (Indexed) | Assembly (Indexed) | Part No. (Indexed) | Price | Sub-Part No. | Price (Marked as Indexed) |
|---|---|---|---|---|---|---|---|
| 1 | 0 | 0001 | A | 01 | 1.75 | 001 | 0.50 |
|  |  |  |  |  |  | 002 | 1.00 |
|  |  |  |  |  |  | 003 | 0.25 |
| 2 | 0 |  | B | 02 | 0.20 | 004 | 0.10 |
|  |  |  |  |  |  | 005 | 0.10 |
| 3 | 0 |  | B | 03 | 0.45 | 006 | 0.20 |
|  |  |  |  |  |  | 003 | 0.25 |
| 4 | 0 | 0002 | C | 04 | 6.60 | 006 | 0.20 |
|  |  |  |  |  |  | 007 | 6.40 |
| ... | ... | ... | ... | ... | ... | ... | ... |
| 24001 | 1 | 8001 | D | 05 | 75.60 | 102 | 1.50 |
|  |  |  |  |  |  | 001 | 0.50 |
|  |  |  |  |  |  | 007 | 6.40 |
| ... | ... | ... | ... | ... | ... | ... | ... |
| 24051 | 0 |  | E | 06 | 24.40 | 306 | 0.25 |
| ... | ... | ... | ... | ... | ... | ... | ... |
| Col. 1 | 2 | 3 | 4 | 5 | 6 | 7 | 8 |

By way of further example, in a large database (e.g., database 20) retrieving the record which has the highest price for a sub-part (i.e., cols. 7 and 8) with BOM Id of 8001, mini index map is created, as shown in col. 2. The mini index map column indicates for which records a mini-view exists. When the database is queried to get the least expensive sub-part in a particular BOM Id, Assembly and Part combination, all matching records are retrieved, and they are sorted in cache or memory. The result is then queried to get the sub-part with the least price. However, a positive number indicates that a mini-view exists and is the link to the index for the mini-view. A negative number indicates that a mini-view is no longer valid due to a record being added or deleted and recreation of the mini-view may be warranted. Other indicators may be employed. For a record associated with BOM ID 8001 (indexed), e.g., record 24,001, the mini-index map (i.e., col. 2) has a value of 1 denoting that mini-index 1 (out of "n" possible mini-indexes) is associated with this category.

Table 3 shows an illustrative mini-index that may be referenced in the mini-index map of Table 2, column 2. Table 3 may include independent indexes to manage an independent mini-view, and, in this example, includes indexed category of Price (for sub-part number).

TABLE 3

| Mini Index | Price (for sub-part) (Indexed) | Sub-part Number |
|---|---|---|
| 1 | 0.10 | 004 |
| 2 | 0.20 | 006 |
| 3 | 0.25 | 003 |
| ... | ... |  |
| 50 | 6.40 | 007 |
| Col. 1 | 2 | 3 |

The mini-index map is assigned to zero, i.e., no mini-view/mini-index is created for a price category. When the server receives the request for data in the Price category, the server may sort the records at run-time. This is beneficial in large databases where the amount of non-indexed data is accessed less frequently. Since a portion of data is indexed at run-time, it may require more time to index the data, but the overall time to access a record is less, providing performance enhancements to the overall efficiencies in the database management system.

In another circumstance, the mini-index map is assigned a positive or negative number where there is a substantially large number of records (e.g., thousands) for a particular category, for example, BOM Id 8001 (Table 1), and where the category represents a set of BOMs that are not yet approved, searching for a particular record—to get the price of the most expensive sub-part in all unapproved BOMs—may be slow if indexed with the rest of the database records. For this case, the server may maintain a separate mini-index for these sets of values, such as, for example, mini-indexes of Table 3. Based on parameters, the server can evaluate which cases/categories can have mini-indexes. Periodic checks validate if these categories continue to meet criteria to create a mini-index. If the criteria are no longer met, the associated mini-index maps (e.g., Table 2, col. 2) are set to zero (or other null indicator) and the mini-index may be deleted.

The mini-indexes are primarily managed by the server, but an administrator may also establish these indexes. The size of cache assigned for sorting of records (e.g., 15*a* or 15*b*) is dependent on the average number of records in a category for a view, or size of one or more categories to be sorted. If the average number of records is substantially larger for a particular category, it is a candidate for mini-index creation and this is one of the parameters that the server monitors.

If a record is added or deleted from the view, the mini index map is set to negative mini-index number (e.g., minus one). The corresponding mini-index is updated or recreated when the server has idle resources or there is a request for the corresponding information, whichever comes first. Once the mini-index is updated or recreated, the mini index map (Table 2, col. 2) may be updated.

Using the Invention

FIGS. 2A-5 are flow diagrams showing steps of embodiments of using the invention. FIGS. 2A-5 may equally represent a high-level block diagram of components of the invention implementing the steps thereof. The steps of FIGS. 2A-5 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 2A:
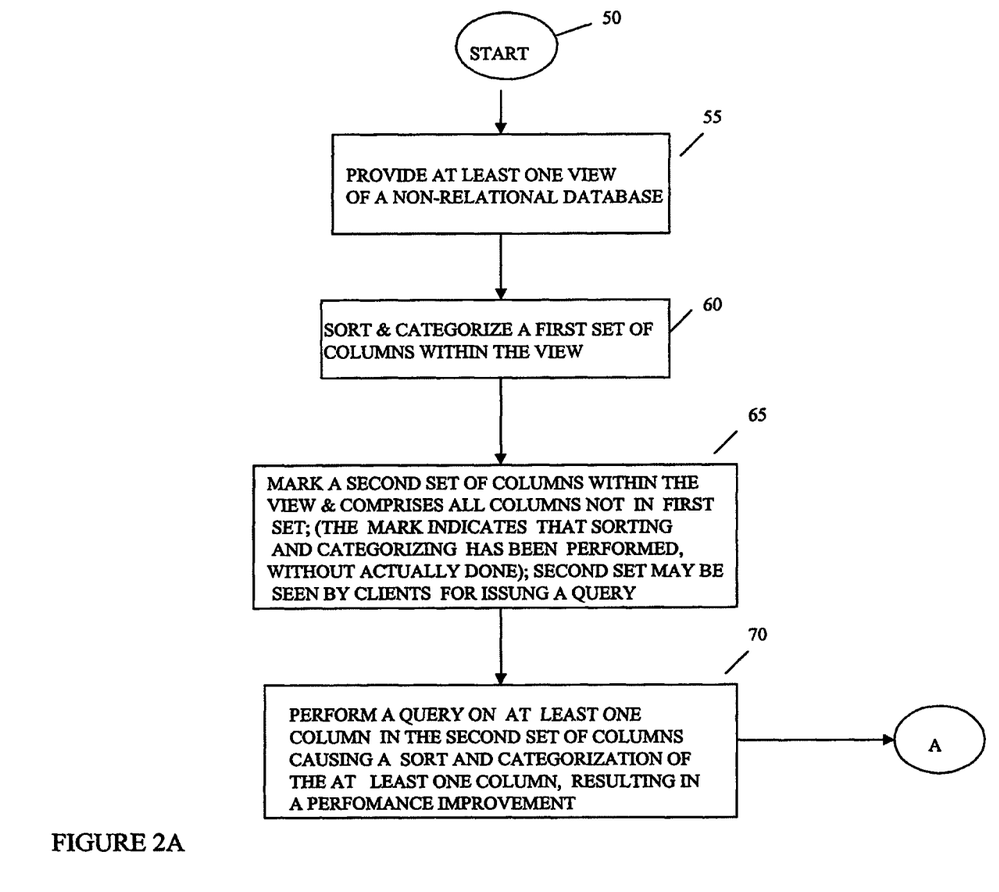
FIGS. 2A and 2B are flow charts showing steps of an embodiment for using the invention.
Figure 2B:
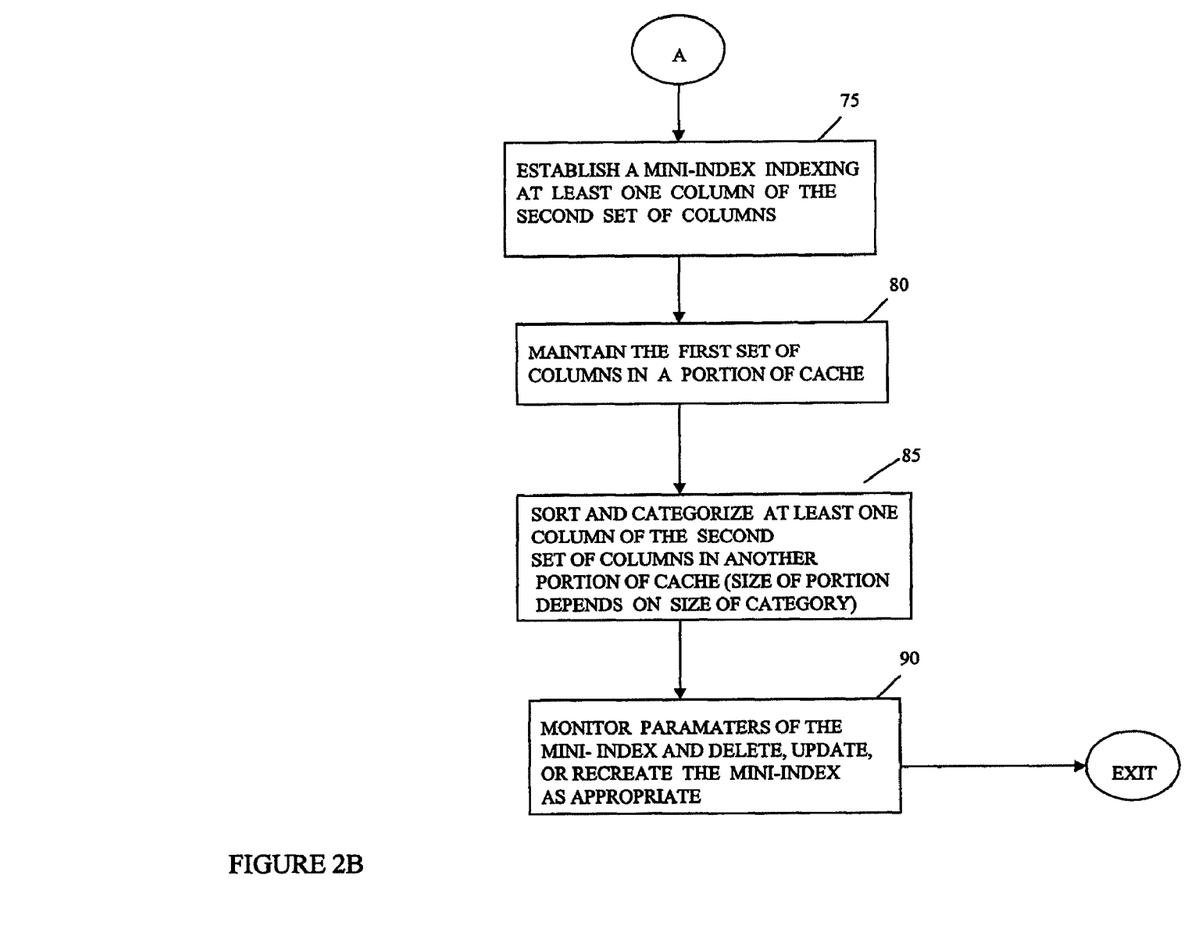

The invention may be used in non-relational databases in order to improve overall performance of the database management system. The steps of an embodiment for using the invention are shown in FIGS. 2A and 2B starting at step 50. At step 55, at least one view of a non-relational database is provided. At step 60, a first set of columns within the view is sorted and categorized. At step 65, a second set of columns within the view are marked. The second set of columns may be all columns not in the first set of columns and the mark indicates that sorting and categorizing has been performed on the second set of columns without having been actually performed. The second set of columns may be visible as collapsed data to a client for issuing a query.

At step 70, when a query is performed on at least one column of the second set of columns, a sort and categorization of the at least one column is performed. (The designation "A" connects the steps of FIG. 2A with that of FIG. 2B.) At step 75, a mini-index is established indexing the at least one column of the second set of columns, which is used as an alternate view. At step 80, the first set of columns is assigned and maintained in a portion of cache sized appropriately for the first set of columns. At step 85, at least one column of the second set of columns is assigned, sorted and categorized in a second portion of cache, the size of the cache may be related to the size of the category (i.e., the at least one column) or availability of server resources. The at least one column of the second set is maintained in the second portion until updated, deleted, or recreated. At step 90, the parameters of the mini-index are monitored to ascertain whether the mini-index is still viable. This may cause deletion, updating, or recreating of the mini-index as appropriate to the monitoring. The sequence then terminates.

Figure 3:
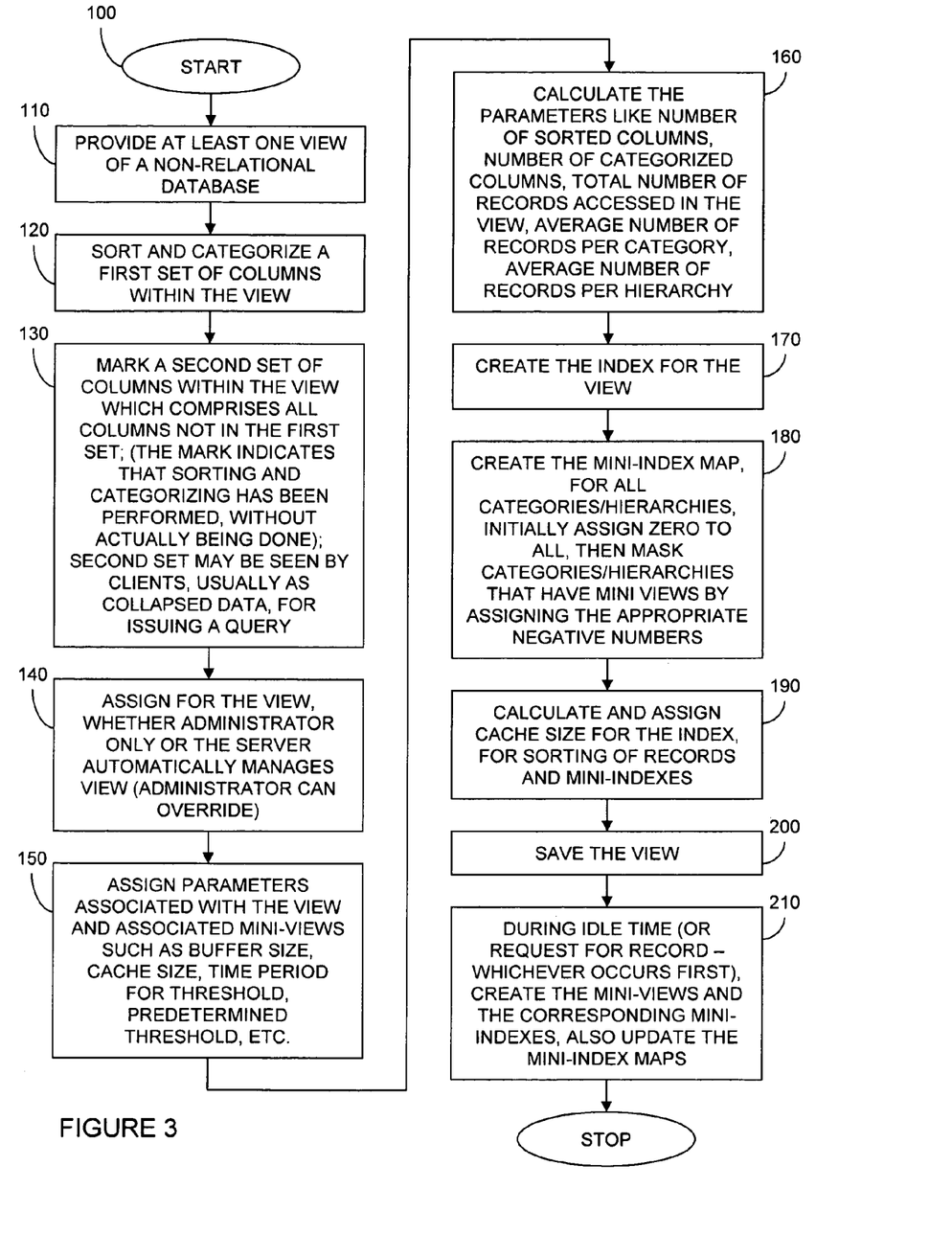
FIG. 3 is a flowchart showing steps of an embodiment for creating a mini-index.

FIG. 3 is a flowchart showing steps of an embodiment for creating a mini-index, according to the invention, starting at 100. At step 110, at least one view of a non-relational database is provided. At step 120, a first set of columns within the view is sorted and categorized. At step 130, a second set of columns within the view comprising all columns not in the first set of columns is marked. The mark indicates that sorting and categorization has been performed without actually being done (the mark is done prior to actually performing a sort and categorization). The second set may be seen by clients, usually as collapsed data for issuing a query.

At step 140, an assignment for the view is done which indicates whether only an administrator manages a view or the server manages the view (administrator may override the server). At step 150, parameters associated with the view and mini-views are assigned such as, for example, buffer size, time periods for threshold, predetermination threshold, etc. At step 160, parameters are calculated such as, for example, number of sorted columns, number of categorized columns, total number of records accessed in the view, average number of records per category, average number of records per hierarchy, etc.

At step 170, the index for the view is created. At step 180, a mini-index map is created for all categories/hierarchies and has initial assignment of zero (or equivalent indicator), then categories/hierarchies that must have mini-views are marked by assigning appropriate negative numbers. At step 190, a calculation and assignment of cache size is made for sorting of records and mini-indexes. At step 200, the view is saved. At step 210, during idle time or a request is made for a record in the mini-views, which ever occurs first, the mini-views and the corresponding mini-indexes are created and the corresponding index maps are set to positive numbers. The sequence then exits.

Figure 4:
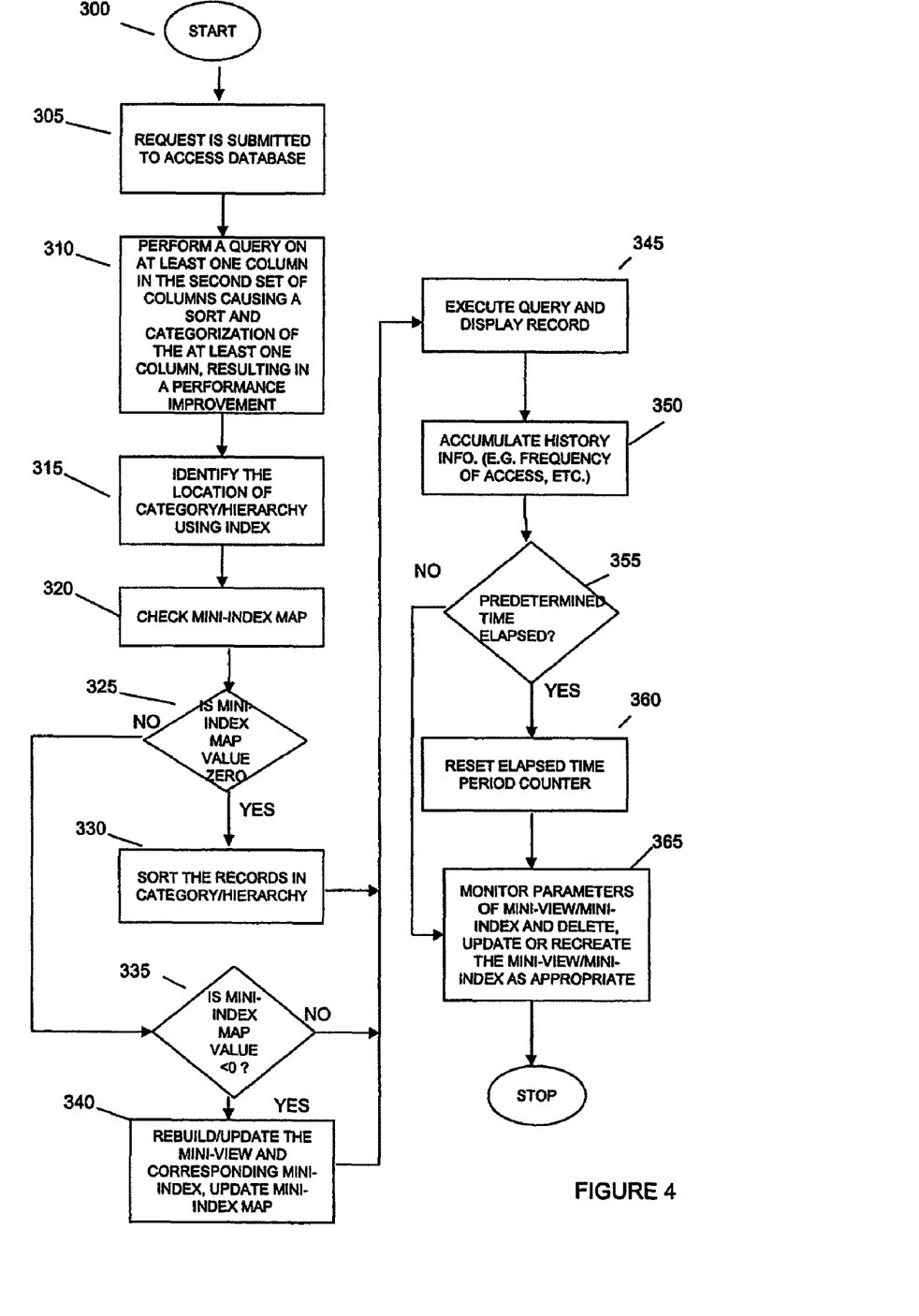
FIG. 4 is a flowchart showing steps of an embodiment of accessing mini-index maps.

FIG. 4 is a flowchart showing steps of an embodiment of accessing mini-index maps, starting at step 300. At step 305, a request is submitted to access a database. At step 310, when a query is performed on at least one column in the second set of columns, it causes a sort and categorization of the at least one column. The result, overall, is a performance improvement in accessing the data. At step 315, the location of the category/hierarchy is identified using the index. At step 320, a check is made on the mini-index map. At step 325, a decision whether the mini-index map value is zero, and if zero, the records in the category/hierarchy are sorted in the allocated cache or memory at step 330. The process continues with step 345. If not zero, then at step 335, a check is made whether the mini-index map value is negative. If the check is negative, at step 340, the mini-view and corresponding mini-index is rebuilt/updated and the mini-index map is updated. If the check is not negative, then at step 340, the query is executed and the record is display or returned. At step 350, history information is accumulated, e.g., frequency of access, etc.

At step 355, a check is made whether a pre-determined time has elapsed. If not, the flow continues at step 365. If, however the predetermined time has elapsed, then at step 360, an elapsed time period counter (for timing the predetermined time) is reset. At step 365, parameters associated with the mini-view/mini-index are monitored. As a result, the mini-view and/or mini-index may be deleted, updated, or recreated as appropriate. The process then exits.

Figure 5:
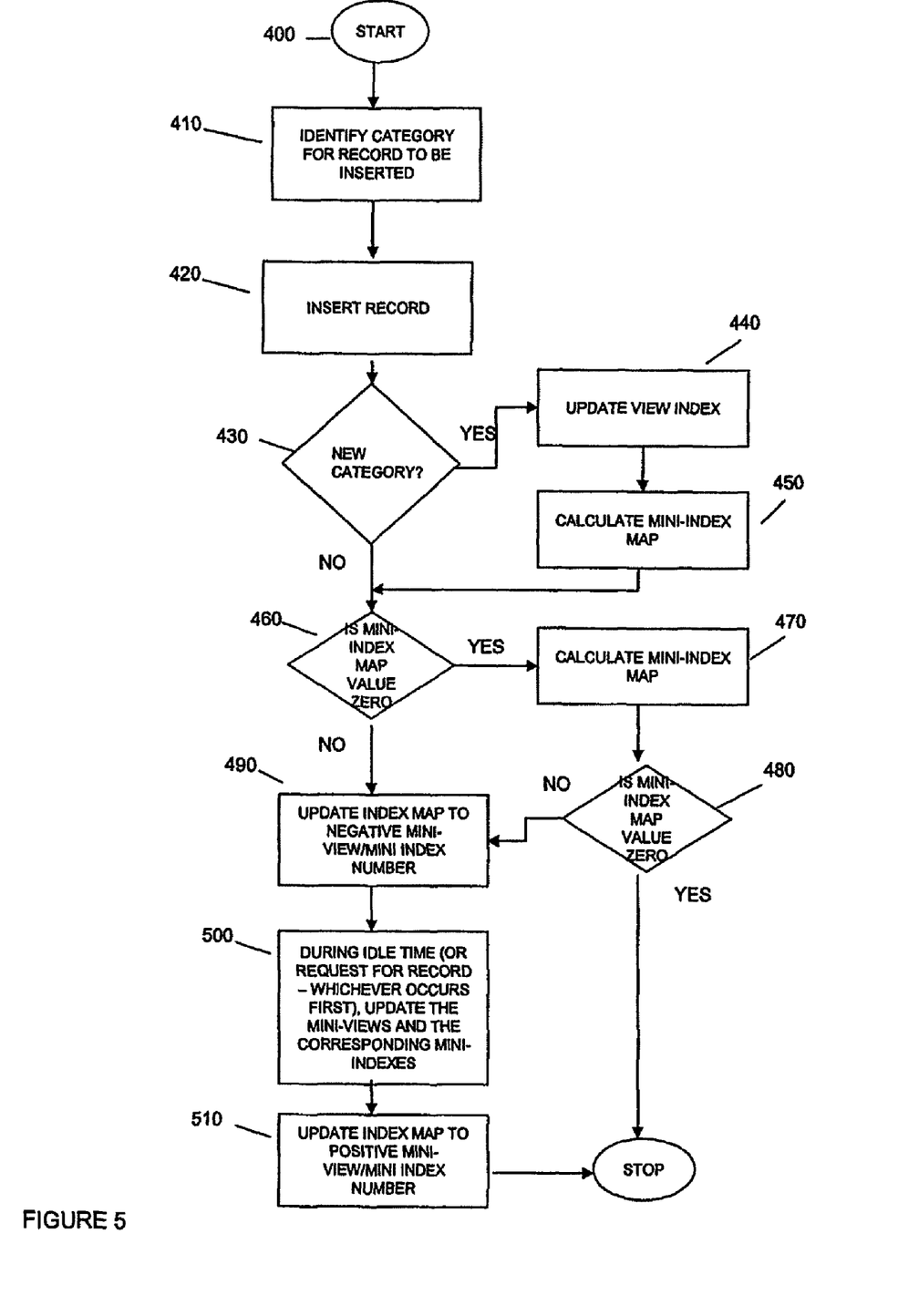
FIG. 5 is a flowchart showing steps of an embodiment for inserting records into a database and updating an associated mini-index map.

FIG. 5 is a flowchart showing steps of an embodiment for inserting records into a database and updating an associated mini-index map, beginning at step 400. At step 410, a category is identified for a record to be inserted. At step 420, the record is inserted. At step 430, a check is made as to whether there is a new category. If yes, at step 440, the view index is updated. Then, at step 450, the mini-index map is calculated. After step 450, or if at step 430 there is no new category, at step 460, a check is made whether the mini-index map is zero, and if so, at step 470, the mini-index map is calculated and at step 480, another check is made whether the mini-index map value is zero, and if so, then the process exits, otherwise the process continues at step 490. If, however, at step 460, the mini-index map value is not zero, then at step 490, the index map is updated to a negative mini-index number. At step 500, during an idle time or a request for a record is received, whichever occurs first, the mini-views are updated along with corresponding mini-indexes. At step 510, the index map is updated to a positive mini-view/index number. The process then exits.

The invention substantially enhances access to data stored in non-relational databases by improving efficiencies in processing time, bandwidth, or memory management of non-RDBMs by reducing the view index size based on parameters, such as, the number of sorted and/or categorized columns in the view.

While the invention has been described in terms of embodiments, those skilled in the art will recognize that the invention can be practiced with modifications and in the spirit and scope of the appended claims.

What is claimed is:

1. A method for optimizing performance of a non-relational database, the method comprising:
   sorting and categorizing a first set of columns within a view of the non-relational database; and
   marking a second set of columns within the view as if the second set of columns were already sorted and categorized prior to actual sorting and categorizing of the second set of columns, the second set of columns including all columns exclusive of the first set of columns.

2. The method of claim 1, further comprising the step of sorting and categorizing at least one column of the second set of columns in response to performing a query on the at least one column.

3. The method of claim 2, further comprising establishing a mini-index indexing the at least one column of the second set of columns.

4. The method of claim 3, further comprising accessing the mini-index to provide increased performance.

5. The method of claim 4, further comprising monitoring parameters of the mini-index, and as a result, performing one of deleting, updating, and recreating the mini-index.

6. The method of claim 5, wherein the parameters include at least one of a number of sorted columns, a number of categorized columns, a number of records that can be accessed in a view, an average number of records per category, and an average number of records per hierarchy.

7. A method for optimizing performance of a non-relational database, the method comprising:
   sorting and categorizing a first set of columns within a view of the non-relational database;
   marking a second set of columns within the view as if the second set of columns were already sorted and categorized prior to actual sorting and categorizing of the second set of columns, the second set of columns including all columns exclusive of the first set of columns; and sorting and categorizing at least one column of the second set of columns in response to performing a query on the at least one column.

8. The method of claim 7, wherein the sorting and categorizing a first set of columns step includes assigning the first set of columns to a portion of a cache.

9. The method of claim 8, wherein the sorting and categorizing at least one column of the second set step includes sorting and categorizing the at least one column of the second set of columns in another portion of the cache.

10. The method of claim 7, further comprising establishing a mini-index indexing the at least one column of the second set of columns.

11. The method of claim 10, further comprising accessing the mini-index by a server to provide increased performance.

12. The method of claim 11, further comprising monitoring parameters of the mini-index, and as a result, performing one of deleting, updating, and recreating the mini-index.

13. The method of claim 12, wherein the parameters include at least one of a number of sorted columns, a number of categorized columns, a number of records that can be accessed in a view, an average number of records per category, and an average number of records per hierarchy.

14. The method of claim 7, further comprising maintaining the first set of columns in a portion of cache.

15. The method of claim 14, further comprising maintaining the at least one column of the second set of columns in another portion of cache.

16. The method of claim 15, further comprising sizing the another portion of cache depending on the size of the at least one column of the second set of columns.

17. The method of claim 7, wherein the marking step permits clients to see the second set of columns and to issue a query on the at least one column of the second set of columns.

18. A system to optimize non-relational database performance, comprising computer program code in combination with hardware, the computer program code being stored on a storage media and comprising:

a component to sort and categorize a first set of columns within a view of the non-relational database;

a component to mark a second set of columns within the view, wherein the second set of columns comprises all columns within the view that are not in the first set of columns, and wherein the mark indicates that sorting and categorizing has been performed on the second set of columns without actually having performed the sorting and the categorizing; and a component to sort and categorize at least one column of the second set of columns in response to a query on the at least one column.

19. The system of claim 18, further comprising a component to sort and categorize the at least one column of the second set in a portion of a cache and assign the first set of columns to another portion of the cache.

20. The system of claim 18, further comprising a component to establish a mini-index that indexes the at least one column of the second set of columns.

21. The system of claim 18, further comprising a component to access the mini-index by a server.

22. The system of claim 18, further comprising a component to monitor parameters of the mini-index, and as a result, to perform one of deleting, updating, and recreating the mini-index.

23. The system of claim 22, wherein the parameters include at least one of a number of sorted columns, a number of categorized columns, a number of records that can be accessed in a view, an average number of records per category, and an average number of records per hierarchy.

24. The system of claim 18, further comprising a component to permit clients to see the second set of columns and to issue a query on the at least one column of the second set of columns.

25. A computer program product comprising a storage media having readable program code embodied in the storage media, the computer program product includes:

a first computer program code to sort and categorize a first set of columns within a view of a non-relational database;

a second computer program code to mark a second set of columns within the view, wherein the second set of columns comprises all columns within the view that are not in the first set of columns, and wherein the mark indicates that sorting and categorizing has been performed on the second set of columns without actually having performed the sorting and the categorizing; and a third computer program code to sort and categorize at least one column of the second set of columns in response to a query on the at least one column.

* * * * *